United States Patent
Dhuse et al.

(10) Patent No.: US 10,073,638 B2
(45) Date of Patent: Sep. 11, 2018

(54) AUTOMATIC NAMESPACE ORDERING DETERMINATION

(71) Applicant: International Business Machines Corporation, Armonk, NY (US)

(72) Inventors: Greg R. Dhuse, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/400,529

(22) Filed: Jan. 6, 2017

(65) Prior Publication Data

US 2017/0115910 A1    Apr. 27, 2017

Related U.S. Application Data

(63) Continuation-in-part of application No. 13/866,457, filed on Apr. 19, 2013, now Pat. No. 9,632,872.

(60) Provisional application No. 61/655,753, filed on Jun. 5, 2012.

(51) Int. Cl.
*G06F 3/06* (2006.01)
*H04L 29/08* (2006.01)

(52) U.S. Cl.
CPC .......... *G06F 3/0619* (2013.01); *G06F 3/0665* (2013.01); *G06F 3/0689* (2013.01); *H04L 67/1097* (2013.01)

(58) Field of Classification Search
CPC ............. G06F 11/1658; G06F 11/1662; H04L 67/1097; H04L 29/08549
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Edward J Dudek, Jr.
*Assistant Examiner* — Andrew D Russell
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device detects a commissioned storage unit (SU) that was previously non-commissioned and identifies SU(s) that include commissioned SUs among the SUs. The computing device then identifies a SU topology of the SU(s) and selects a subset of the SU(s) based on the SU topology. The computing device then obtains SU address range assignments of the subset of the SU(s) facilitates assignment of a SU address range for the commissioned SU that was previously non-commissioned within the SUs based on the SU address range assignments of the subset of the SU(s).

20 Claims, 7 Drawing Sheets

(56) References Cited

U.S. PATENT DOCUMENTS

| | | | |
|---|---|---|---|
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,296,180 | B1 * | 11/2007 | Waterhouse ........ G06F 11/1076 714/2 |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

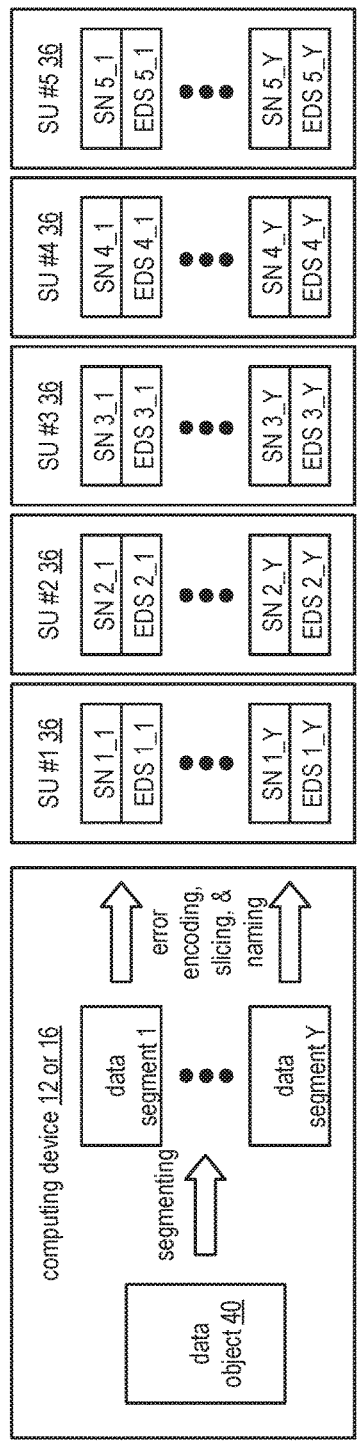
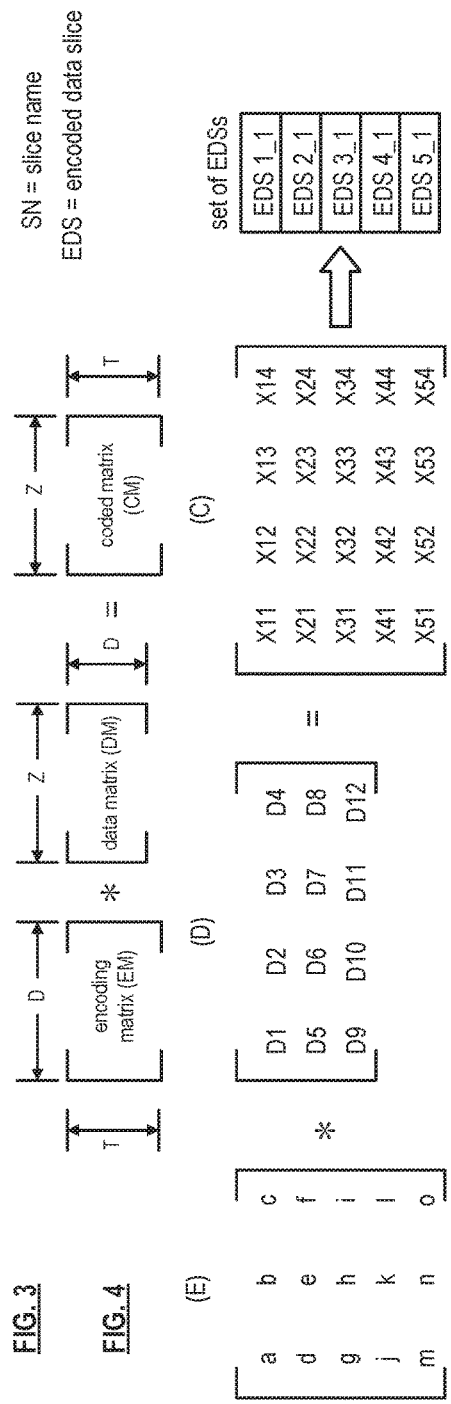
FIG. 3
FIG. 4
FIG. 5
FIG. 6

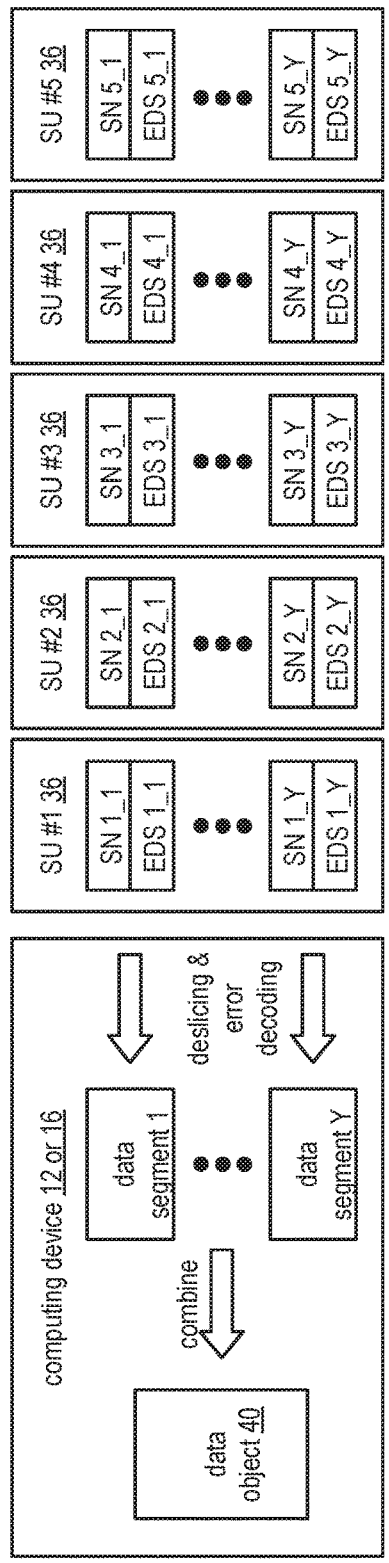

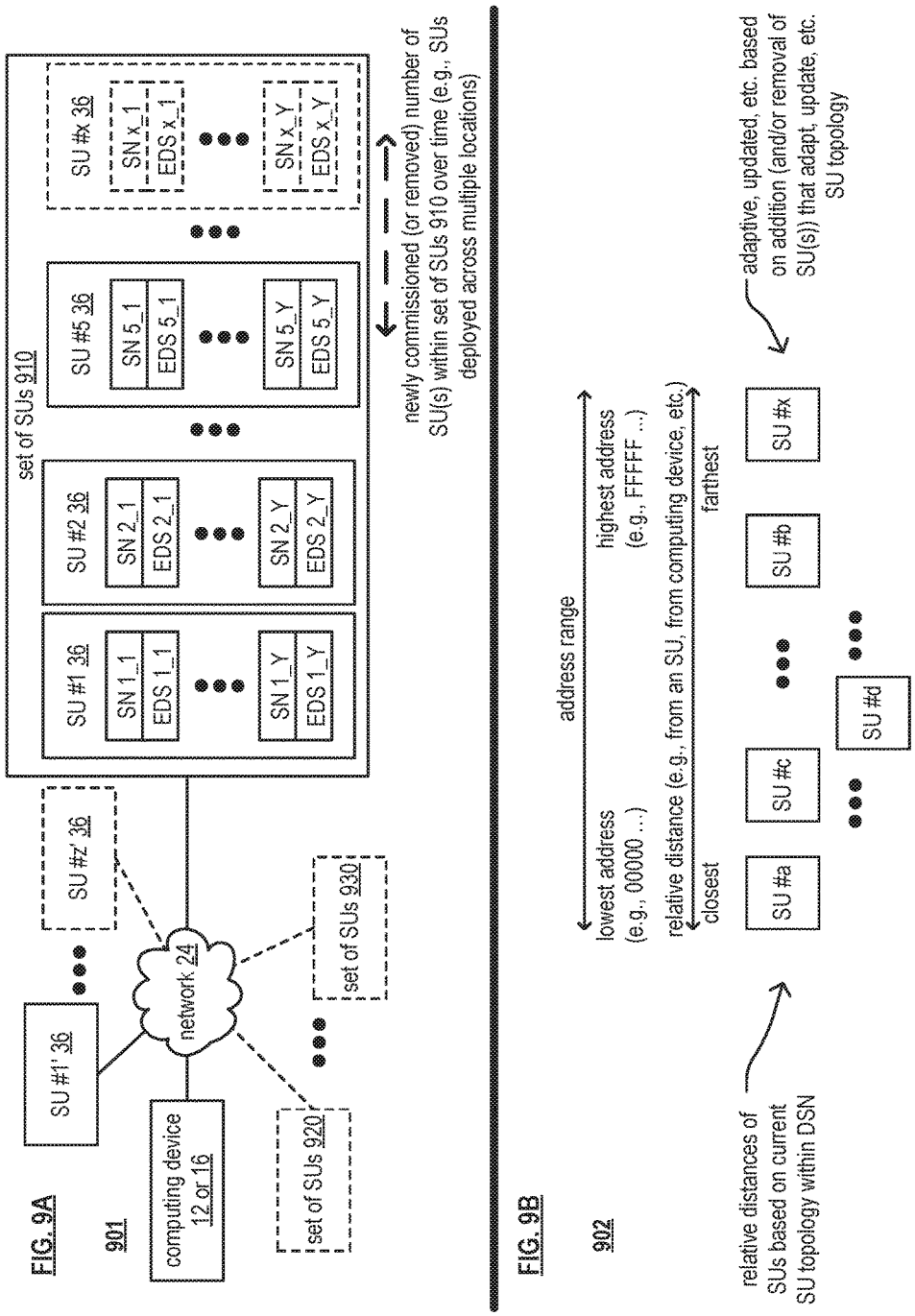

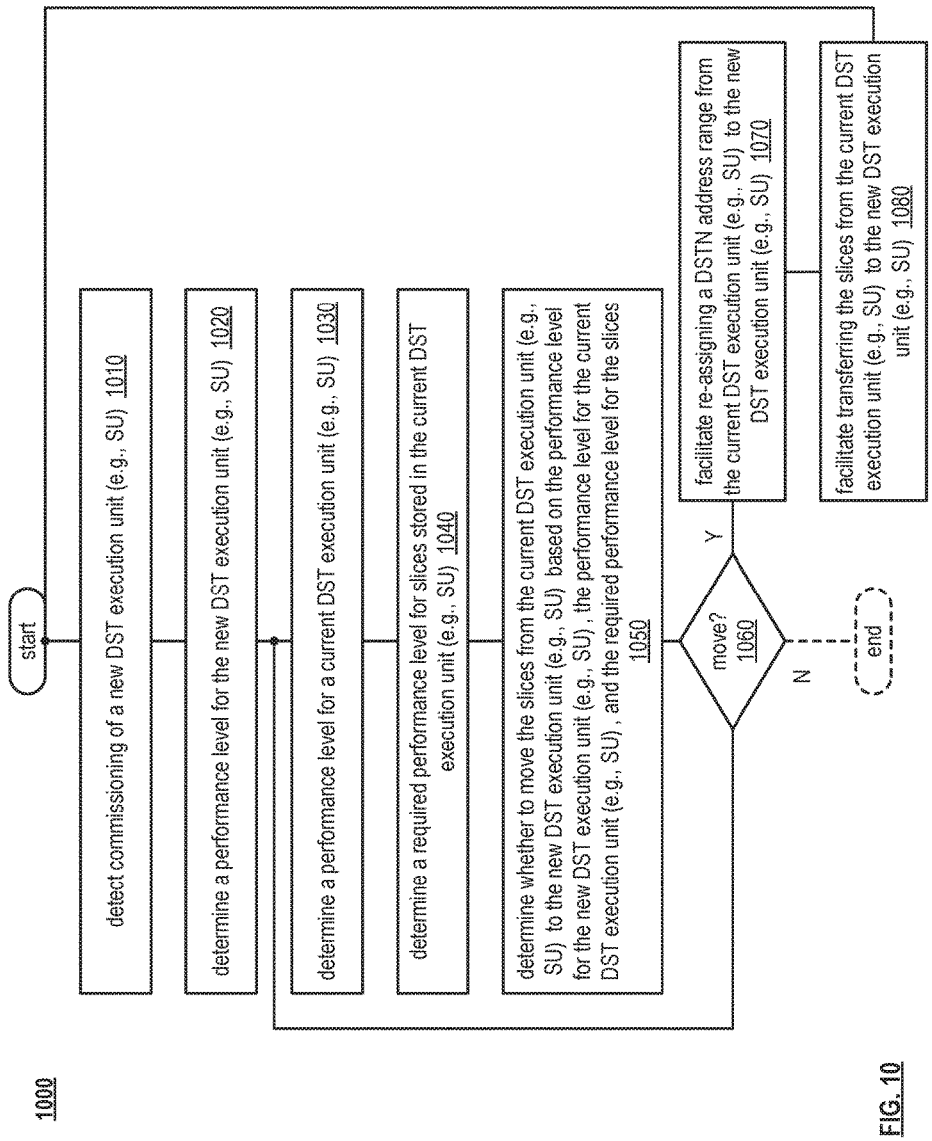

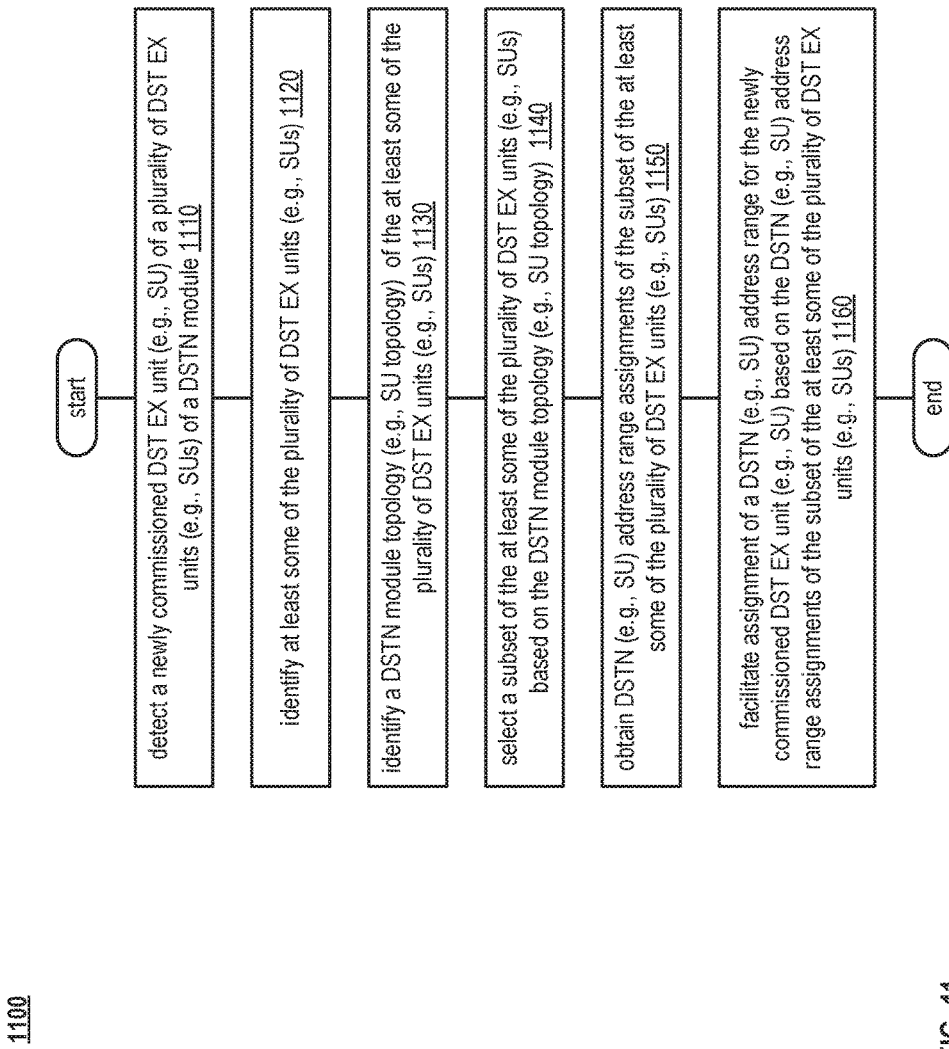

AUTOMATIC NAMESPACE ORDERING DETERMINATION

CROSS REFERENCE TO RELATED PATENTS

The present U.S. Utility patent application also claims priority pursuant to 35 U.S.C. § 120, as a continuation-in-part (CIP) of U.S. Utility patent application Ser. No. 13/866,457, entitled "REPRIORITIZING PENDING DISPERSED STORAGE NETWORK REQUESTS," filed Apr. 19, 2013, pending, which claims priority pursuant to 35 U.S.C. § 119(e) to U.S. Provisional Application No. 61/655,753, entitled "ESTABLISHING AN ADDRESS RANGE ASSIGNMENT IN A DISTRIBUTED STORAGE AND TASK NETWORK," filed Jun. 5, 2012, both of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not provide acceptable solutions to adapt to changing conditions therein. For example, the prior art does not provide an adequate means by which the overall data storage system may be optimized to ensure a more or most effective performance in such situations such as when hardware, resources, and/or servers, etc. are brought online and/or removed from service.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

FIG. 9A is a schematic block diagram of an example of DSN in accordance with the present invention;

FIG. 9B is a schematic block diagram of an example of address ranges for SUs within a DSN in accordance with the present invention;

FIG. 10 is a diagram illustrating an embodiment of a method for execution by one or more computing devices in accordance with the present invention; and FIG. 11 is a diagram illustrating another embodiment of a method for execution by one or more computing devices in accordance with the present invention.

DETAILED DESCRIPTION OF THE INVENTION

Figure 1:
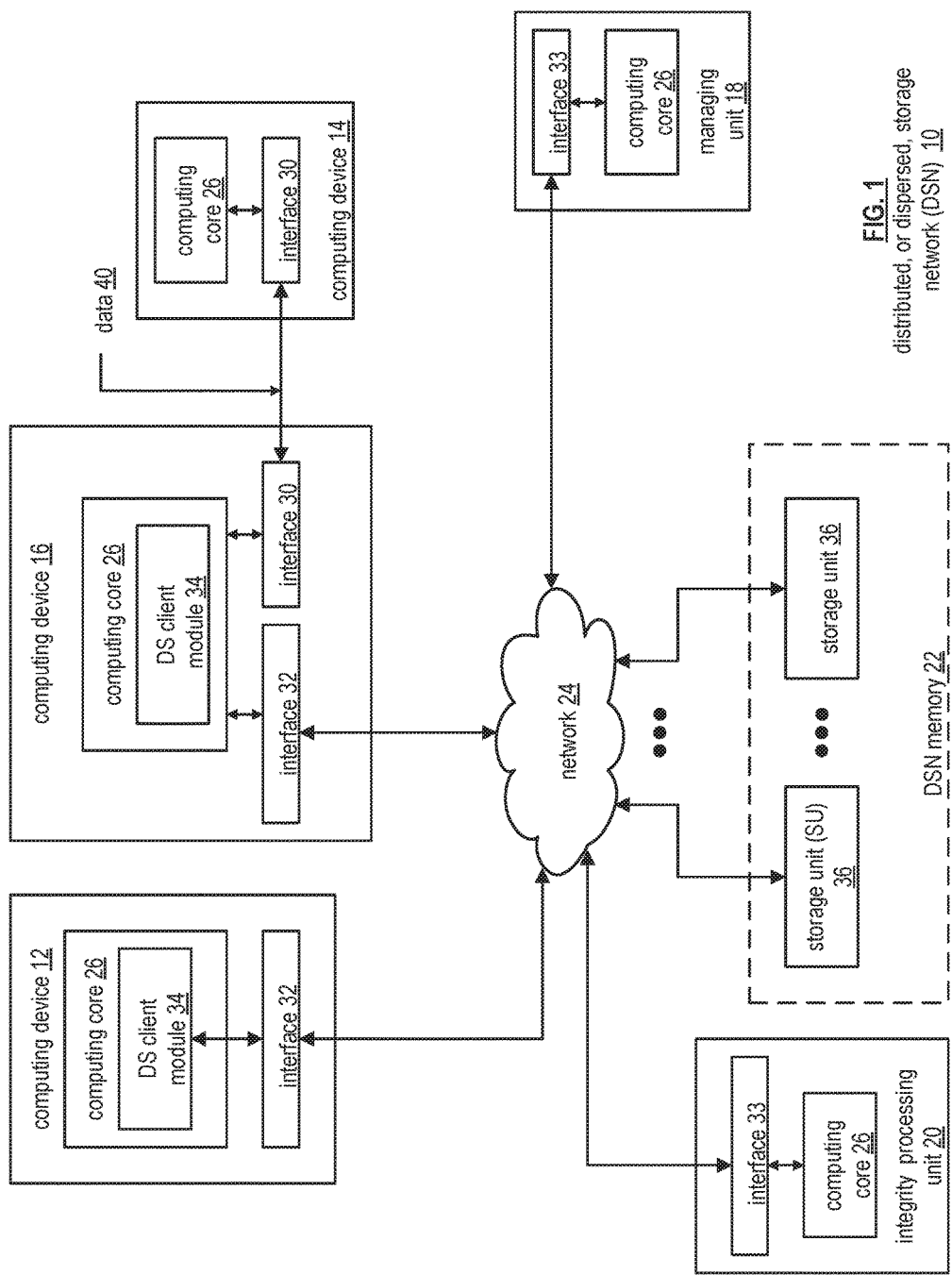
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
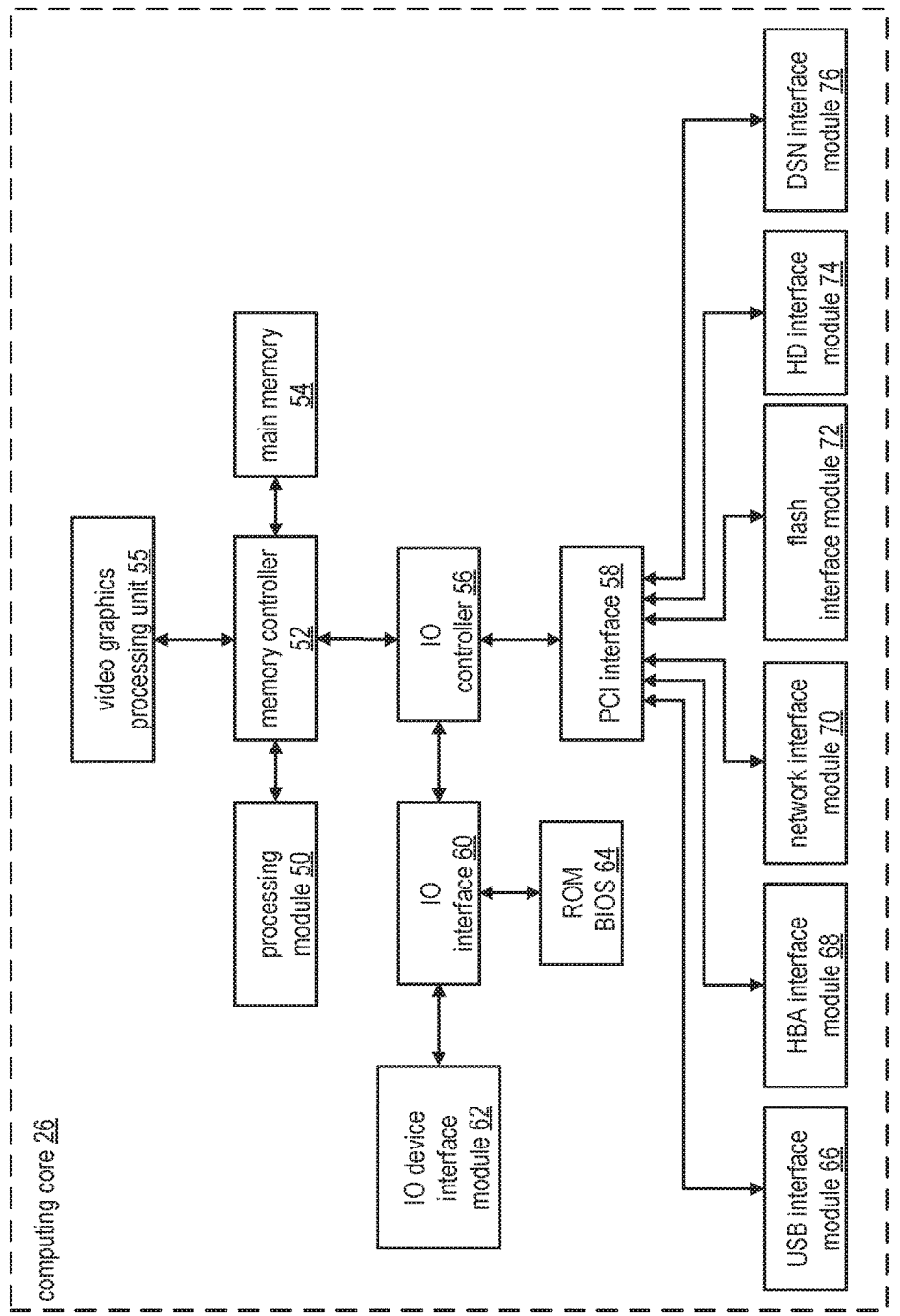
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9A is a schematic block diagram of an example of DSN in accordance with the present invention. A DSN includes a computing device 12 or 16 that is configured to interact with a set of SUs 910 (e.g., that includes storage units (SUs) that store encoded data slices (EDSs)) via network 24. In some examples, the computing device 12 or 16 is also configured to interact with one or more other sets of SUs 920, and so on up to 930. In addition, note that one or more SUs such as SU #1'36 and so on up to SU #z' 36 can be implemented without being specifically included within a particular set of SUs 910 (or 920, and so on up to 930) and be separately implemented. However, note that such one or more SUs such as SU #1'36 and so on up to SU #z'36 may be included to (e.g., commissioned) into any set, group, plurality, etc. of SUs as may be desired. Note that the set of SUs 910 may be implemented to include SUs #1-#5 36 and optionally up to one or more additional SUs #z 36. Note that when one or more SUs is decommissioned from the DSN and/or any set, group, plurality, and/or subset, etc. of the DSN, the computing device 12 or 16 may also be configured to perform an encoded data slice (EDS) balancing operation for the set of EDSs stored among the set of SUs 910 such that each SU of the set of SUs 910 (e.g., upon the commissioning and/or removal of one or more SUs there from) so that the respective SUs within the set of SUs 910 each respectively stores an approximately same number of EDSs of the set of EDSs.

Also, with respect to this diagram and/or others included herein, note that a DSTN module may be implemented includes a plurality of distributed storage and/or task (DST) execution units 36 (e.g., storage units (SUs)) that may be located at geographically different sites (e.g., one in Chicago, one in Milwaukee, etc.). Each of the DST execution units (e.g., SUs) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

In an example of operation and implementation, a computing device includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations.

For example, the computing device 12 or 16 detects a commissioned storage unit (SU) that was previously non-commissioned within a set of SUs 910 that are implemented within the DSN. Then, the computing device 12 or 16 identifies at least some of the plurality of storage units (SUs) that include commissioned SUs among the set of SUs 910. The computing device 12 or 16 then identifies a SU topology of the at least some of the set of SUs 910. The computing device 12 or 16 then selects a subset of the at least some of the set of SUs 910 based on the SU topology. Then, the computing device 12 or 16 obtains SU address range assignments of the subset of the at least some of the set of SUs 910. The computing device 12 or 16 then facilitates assignment of a SU address range for the commissioned SU that was previously non-commissioned within the set of SUs 910 based on the SU address range assignments of the subset of the at least some of the set of SUs 910.

In some examples, the computing device 12 or 16 detects the commissioned SU that was previously non-commissioned within the set of SUs 910 based on at least one of a commissioning message received from a SU within the set of SUs 910, a query operation with the SU within the set of SUs 910, receiving an authentication request from the SU within the set of SUs 910, or detection of a reset of the commissioned SU that was previously non-commissioned within the set of SUs 910.

In even other examples, the computing device 12 or 16 identifies the at least some of the set of SUs 910 that include commissioned SUs among the set of SUs 910 based on one or more of a lookup from a database that stores commissioning information regarding the at least some of the set of SUs 910, a query operation associated with at least one SU of the at least some of the set of SUs 910, a ping test operation with the at least one SU of the at least some of the set of SUs 910, obtaining of an internet protocol address of the at least one SU of the at least some of the set of SUs 910, identification of a common router identifiers among the at least one SU of the at least some of the set of SUs 910, a measure of a level of bandwidth associated with at least one SU of the at least some of the set of SUs 910, and/or an estimation of a distance to each SU of the at least some of the set of SUs 910.

In some examples, note that the SU topology of the at least some of the set of SUs 910 indicates a physical layout and/or a virtual layout of the at least some of the set of SUs 910 with respect to each other and to the commissioned SU that was previously non-commissioned within the set of SUs 910.

In some examples, the computing device 12 or 16 selects the subset of the at least some of the set of SUs 910 based on the SU topology based on a favorable condition of the commissioned SU that was previously non-commissioned within the set of SUs 910. In various examples, the favorable condition includes one or more of a physical proximity of the commissioned SU that was previously non-commissioned within the set of SUs 910 favorably comparing to a physical proximity threshold, a virtual proximity of the commissioned SU that was previously non-commissioned within the set of SUs 910 favorably comparing to a virtual proximity threshold, a bandwidth availability of the commissioned SU that was previously non-commissioned within the set of SUs 910 favorably comparing to a bandwidth threshold, and/or a performance level of the commissioned SU that was previously non-commissioned within the set of SUs 910 favorably comparing to a performance threshold.

In even other examples, the computing device 12 or 16 obtains the SU address range assignments of the subset of the at least some of the set of SUs 910 based on one or more of a lookup from a database that stores commissioning information regarding the SU address range assignments of the subset of the at least some of the set of SUs 910, receipt of the SU address range assignments of the subset of the at least some of the set of SUs 910 from another computing device or a SU of the set of SUs 910, and/or a query operation with the SU within the set of SUs 910.

In some examples, the computing device 12 or 16 facilitates the assignment of the SU address range for the commissioned SU that was previously non-commissioned within the set of SUs 910 based on the SU address range assignments of the subset of the at least some of the set of SUs 910 includes one or more of selection of an available address range with regards to the subset of the at least some of the set of SUs 910, issuance of a range assignment request that includes a selected address range for the assignment of the SU address range to another computing device or a SU of the set of SUs 910, receipt of a favorable address range assignment response from the another computing device or the SU of the set of SUs 910, storing the selected address range, and/or sending the selected address range to the subset of the at least some of the set of SUs 910.

Note that the computing device may be located at a first premises that is remotely located from at least one SU of a plurality of SUs within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

FIG. 9B is a schematic block diagram of an example of address ranges for SUs within a DSN in accordance with the present invention. This disclosure presents, among other things, various examples by which a group of dispersed or distributed storage (DS) units (e.g., storage units (SUs)) may be deployed across multiple locations (e.g., racks, rooms, sites, regions). Each DS unit then using a discovery procedure, or a pre-set list, begins to contact the other DS units. The goal of this contact is to determine the relative distance between themselves. The DS units may use any of round trip time, number of network hops, geo-IP location, common router names for network routes, level of bandwidth between them, or other characteristics of their deployed topology to build a representation of the organization of the dsNet. Those DS units which possess the greatest determined distance (longest round trip time (RTT), greatest number of hops, etc.) are then placed at opposite ends of the namespace. For example, one will be assigned a range starting with 00000 . . . , and the other at the farthest end will be assigned a range ending in FFFFF . . . . All of the DS units between, determine ranges which are logically close in the namespace to other DS units which have the lowest determined distance to them. One goal of this auto configuration is to arrive upon a namespace in which units which are physically close are logically close in the namespace. When a new DS unit is placed into the system, it can begin its own determination process to decide in which position it should insert itself into the namespace, based on its determined location relative to other DS units. E.g., if it determines it has the lowest latency between units A, and B, and unit A has range 666-777, and unit B has range 778-999, the new DS unit may solicit the range 777-778 (exclusive), and expand as migration and balancing occur.

For example, consider a group, set, and/or plurality, etc. of SUs that includes SU #a, SU #ab SU #c, SU #d, and so on up to SU #x, then the relative distance of those SUs may be determined based on a current SU topology within the DSN. Consider that SU #a is relatively closest, followed by SU #c, followed by SU #d, and so on up to followed by SU #b, and so on to followed by SU #x. The relatively closest SU #a is provided the lowest SU address in the SU address range (e.g., 00000 . . . ) and the relatively farthest SU #x is provided the highest SU address in the SU address range (e.g., FFFFF . . . ). A commissioned storage unit (SU) that was previously non-commissioned within a plurality of SUs that are implemented within the DSN is then provided assignment of a SU address range for the commissioned SU that was previously non-commissioned within the plurality of SUs based on the SU address range assignments of the subset of the at least some of the plurality of SUs. For example, the commissioned SU that was previously non-commissioned within a plurality of SUs that are implemented within the DSN is provided a particular assignment of a SU address range based on its relative location within the SU topology of the SUs that includes the commissioned SU. For example, when the commissioned SU is SU #b, then the SU #b is assigned the SU address range associated with that particular SUs's location (e.g., SU #b location) within the SU topology (e.g., relatively closer to but less than the highest SU address in the SU address range (e.g., FFFFF . . . ) than to the lowest SU address in the SU address range (e.g., 00000 . . . ).

FIG. 10 is a diagram illustrating an embodiment of a method 1000 for execution by one or more computing devices in accordance with the present invention. This diagram shows a flowchart illustrating an example of assigning an address range. The method 1000 begins at a step 1010 where processing module (e.g., of a distributed storage and task (DST) client module) detects commissioning of a new DST execution unit (e.g., SU). The detecting may be based on one or more of receiving an activation message, receiving an error message, and receiving a response to a query. The method 1000 continues at the step 1020 where the processing module determines a performance level for the new DST execution unit (e.g., SU). The determining may be based on one or more of a test, a query, retrieving the performance level, and a lookup based on one or more of a DST execution unit (e.g., SU) model and configuration information of the DST execution unit (e.g., SU).

The method 1000 continues at the step 1030 where the processing module determines a performance level for a current DST execution unit (e.g., SU). The determining may be based on one or more of a test, a query, retrieving the performance level, and a lookup based on one or more of a DST execution unit (e.g., SU) model and configuration information of the current DST execution unit (e.g., SU). The method 1000 continues at the step 1040 where the processing module determines a required performance level for slices stored in the current DST execution unit (e.g., SU). The determining may be based on one or more of a query, retrieving, receiving the required performance level, and accessing a service level agreement.

The method 1000 continues at the step 1050 where the processing module determines whether to move the slices from the current DST execution unit (e.g., SU) to the new DST execution unit (e.g., SU) based on the performance level for the new DST execution unit (e.g., SU), the performance level for the current DST execution unit (e.g., SU), and the required performance level for the slices. The processing module indicates to move the slices when the performance level of the current DST execution unit (e.g., SU) does not compare favorably with the required performance level for the slices and the performance level of the new DST execution unit (e.g., SU) compares favorably to the required performance level for the slices. The method 1000 loops back to the step 1030 where the processing module determines the performance level for the current DST execution unit (e.g., SU) when the processing module determines not to move the slices. The method 1000 continues to the next step 10170 when the processing module determines to move the slices.

For example, the method 1000 continues at the next step 1070 where the processing module facilitates reassigning a distributed storage and task network (DSTN) address range from the current DST execution unit (e.g., SU) to the new DST execution unit (e.g., SU), wherein the DSTN address range corresponds to the slices. The facilitating includes one or more of updating a DSTN address to physical location table, updating a DSTN registry, generating and sending an address update message to the current DST execution unit (e.g., SU) (e.g., to remove the DSTN address range), and generating and sending an address range assignment to the new DST execution unit (e.g., SU) (e.g., to add the DSTN address range).

The method 1000 continues at the step 1080 where the processing module facilitates transferring the slices from the current DST execution unit (e.g., SU) to the new DST execution unit (e.g., SU). The facilitating includes sending a transfer request that includes the DSTN address range and an identifier of the new DST execution unit (e.g., SU) to the current DST execution unit (e.g., SU). The facilitating further includes retrieving the slices utilizing the DSTN address range from the current DST execution unit (e.g., SU) (e.g., generating and sending read slice requests) and storing the slices utilizing the DSTN address range in the new DST execution unit (e.g., SU) (e.g., generating and sending write slice requests). The method 1000 loops back to the step 1010 where the processing module detects commissioning of the new DST execution unit (e.g., SU) to look for a further new DST execution unit (e.g., SU). Alternatively, the processing module identifies another current DST execution unit (e.g., SU) as the new DST execution unit (e.g., SU), wherein the other DST execution unit (e.g., SU) is associated with a storage capacity level greater than a capacity threshold.

FIG. 11 is a diagram illustrating another embodiment of a method 1100 for execution by one or more computing devices in accordance with the present invention. This diagram includes a flowchart illustrating another example of assigning an address range. The method 1100 begins at a step 1110 where a processing module (e.g., of a distributed storage and task (DST) client module, of a computing device, of a SU, and/or of another device, etc.) detects a newly commissioned DST execution unit (e.g., SU) of a plurality of DST execution units (e.g., SUs) of a distributor storage and task network (DSTN) module. The detecting includes one or more of receiving a commissioning message, a query, receiving an authentication request, and/or detecting a reset of a new DST execution unit. The method 1100 continues at the step 1120 where the processing module identifies at least some of the plurality of DST execution units (e.g., SUs). The identifying includes at least one of a lookup, a query, receiving a list, and/or accessing registry information.

The method 1100 continues at the step 1130 of the processing module identifies a DSTN module topology (e.g., SU topology) of the at least some of the plurality of DST execution units (e.g., SUs). The identifying includes at least one of a lookup, a query, a ping test, obtaining an internet protocol address, identifying common router identifiers, measuring a level of bandwidth, estimating a distance to each of the at least some of the plurality of DST execution units (e.g., SUs), and/or estimating an access latency to the at least some of the plurality of DST execution units (e.g., SUs). The DSTN module topology (e.g., SU topology) indicates one or more of a physical and a virtual layout of the at least some of the plurality of DST execution units (e.g., SUs) with respect to each other and to the newly commissioned DST execution unit.

The method 1100 continues at the step 1140 for the processing module selects a subset of the at least some of the plurality of DST execution units (e.g., SUs) based on the DSTN module topology (e.g., SU topology) such that a favorable condition exists with regards to the newly commissioned DST execution unit (e.g., SU) and the subset. The favorable condition includes at least one of a close physical proximity, a close virtual proximity, bandwidth availability greater than the bandwidth threshold, and a performance level greater than the performance threshold. For example, the processing module selects the subset to include DST execution units (e.g., SUs) associated with a lowest access latency between the each DST execution unit (e.g., SU) of the subset and the newly commissioned DST execution unit.

The method 1100 continues at the step 1150 of the processing module obtains DSTN address range assignments of the subset of the at least some of the plurality of DST execution units (e.g., SUs). The obtaining includes at least one of a lookup, receiving the assignments, and/or querying at least one of the subset of DST execution units (e.g., SUs). The method 1100 continues at the step 1160 where the processing module facilitates assignment of a DSTN address range for the newly commissioned DST execution unit (e.g., SU) based on the DSTN address range assignments of the subset of the at least some of the plurality of DST execution units (e.g., SUs). The facilitating includes one or more of selecting and available address range with regards to the subset of DST execution units (e.g., SUs), issuing a range assignment request that includes the selected address range, receiving a favorable address range assignment response, storing the selected address range, and sending the selected address range to a subset of DST execution units (e.g., SUs).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   a processing module operably coupled to the interface and to the memory, wherein the processing module, when operable within the computing device based on the operational instructions, is configured to:
      detect a commissioned storage unit (SU) that was previously non-commissioned within a plurality of storage units (SUs) that are implemented within the DSN;
      identify at least some of the plurality of SUs that include commissioned SUs among the plurality of SUs;
      identify a SU topology of the at least some of the plurality of SUs;
      select a subset of the at least some of the plurality of SUs based on the SU topology based on a favorable condition of the commissioned SU that was previously non-commissioned within the plurality of SUs, wherein the favorable condition includes at least one of a physical proximity of the commissioned SU that was previously non-commissioned within the plurality of SUs favorably comparing to a physical proximity threshold, a virtual proximity of the commissioned SU that was previously non-commissioned within the plurality of SUs favorably comparing to a virtual proximity threshold, a bandwidth availability of the commissioned SU that was previously non-commissioned within the plurality of SUs favorably comparing to a bandwidth threshold, or a performance level of the commissioned SU that was previously non-commissioned within the plurality of SUs favorably comparing to a performance threshold;
      obtain SU address range assignments of the subset of the at least some of the plurality of SUs; and
      facilitate assignment of a SU address range for the commissioned SU that was previously non-commissioned within the plurality of SUs based on the SU address range assignments of the subset of the at least some of the plurality of SUs.

2. The computing device of claim 1, wherein the processing module, when operable within the computing device based on the operational instructions, is further configured to:
   detect the commissioned SU that was previously non-commissioned within the plurality of SUs based on at least one of a commissioning message received from a SU within the plurality of SUs, a query operation with the SU within the plurality of SUs, receiving an authentication request from the SU within the plurality of SUs, or detection of a reset of the commissioned SU that was previously non-commissioned within the plurality of SUs.

3. The computing device of claim 1, wherein the processing module, when operable within the computing device based on the operational instructions, is further configured to:
   identify the at least some of the plurality of SUs that include commissioned SUs among the plurality of SUs based on at least one of a lookup from a database that stores commissioning information regarding the at least some of the plurality of SUs, a query operation associated with at least one SU of the at least some of the plurality of SUs, a ping test operation with the at least one SU of the at least some of the plurality of SUs, obtaining of an internet protocol address of the at least one SU of the at least some of the plurality of SUs, identification of a common router identifiers among the at least one SU of the at least some of the plurality of SUs, a measure of a level of bandwidth associated with at least one SU of the at least some of the plurality of SUs, or an estimation of a distance to each SU of the at least some of the plurality of SUs.

4. The computing device of claim 1, wherein the SU topology of the at least some of the plurality of SUs indicates at least one of a physical layout or a virtual layout of the at least some of the plurality of SUs with respect to each other and to the commissioned SU that was previously non-commissioned within the plurality of SUs.

5. The computing device of claim 1, wherein:
   the plurality of SUs is configured to store distributedly a set of encoded data slices (EDSs);
   a data object is segmented into a plurality of data segments;
   a data segment of the plurality of data segments is dispersed error encoded in accordance with dispersed error encoding parameters to produce the set of EDSs; and wherein at least one of:
   a decode threshold number of EDSs are needed to recover the data segment;
   a read threshold number of EDSs provides for reconstruction of the data segment; or
   a write threshold number of EDSs provides for a successful transfer of the set of EDSs from a first at least one location in the DSN to a second at least one location in the DSN.

6. The computing device of claim 1, wherein the processing module, when operable within the computing device based on the operational instructions, is further configured to:
   obtain the SU address range assignments of the subset of the at least some of the plurality of SUs based on at least one of a lookup from a database that stores commissioning information regarding the SU address range assignments of the subset of the at least some of the plurality of SUs, receipt of the SU address range assignments of the subset of the at least some of the plurality of SUs from another computing device or a SU of the plurality of SUs, and a query operation with the SU within the plurality of SUs.

7. The computing device of claim 1, wherein the processing module, when operable within the computing device based on the operational instructions, is further configured to:
   facilitate the assignment of the SU address range for the commissioned SU that was previously non-commissioned within the plurality of SUs based on the SU address range assignments of the subset of the at least some of the plurality of SUs includes at least one of selection of an available address range with regards to the subset of the at least some of the plurality of SUs, issuance of a range assignment request that includes a selected address range for the assignment of the SU address range to another computing device or a SU of the plurality of SUs, receipt of a favorable address range assignment response from the another computing device or the SU of the plurality of SUs, storing the selected address range, or sending the selected address range to the subset of the at least some of the plurality of SUs.

8. The computing device of claim 1, wherein the computing device is located at a first premises that is remotely located from at least one SU of the plurality of SUs within the DSN.

9. The computing device of claim 1 further comprising: a SU of the plurality of SUs within the DSN, a wireless smart phone, a laptop, a tablet, a personal computers (PC), a work station, or a video game device.

10. The computing device of claim 1, wherein the DSN includes at least one of a wireless communication system, a wire lined communication system, a non-public intranet system, a public internet system, a local area network (LAN), or a wide area network (WAN).

11. A computing device comprising:
an interface configured to interface and communicate with a dispersed or distributed storage network (DSN) that includes at least one of a wireless communication system, a wire lined communication system, a non-public intranet system, a public internet system, a local area network (LAN), or a wide area network (WAN);
memory that stores operational instructions; and
a processing module operably coupled to the interface and to the memory, wherein the processing module, when operable within the computing device based on the operational instructions, is configured to:
detect a commissioned storage unit (SU) that was previously non-commissioned within a plurality of storage units (SUs) that are implemented within the DSN;
identify at least some of the plurality of SUs that include commissioned SUs among the plurality of SUs;
identify a SU topology of the at least some of the plurality of SUs, wherein the SU topology of the at least some of the plurality of SUs indicates at least one of a physical layout or a virtual layout of the at least some of the plurality of SUs with respect to each other and to the commissioned SU that was previously non-commissioned within the plurality of SUs;
select a subset of the at least some of the plurality of SUs based on the SU topology based on a favorable condition of the commissioned SU that was previously non-commissioned within the plurality of SUs, wherein the favorable condition includes at least one of a physical proximity of the commissioned SU that was previously non-commissioned within the plurality of SUs favorably comparing to a physical proximity threshold, a virtual proximity of the commissioned SU that was previously non-commissioned within the plurality of SUs favorably comparing to a virtual proximity threshold, a bandwidth availability of the commissioned SU that was previously non-commissioned within the plurality of SUs favorably comparing to a bandwidth threshold, or a performance level of the commissioned SU that was previously non-commissioned within the plurality of SUs favorably comparing to a performance threshold;
obtain SU address range assignments of the subset of the at least some of the plurality of SUs based on at least one of a lookup from a database that stores commissioning information regarding the SU address range assignments of the subset of the at least some of the plurality of SUs, receipt of the SU address range assignments of the subset of the at least some of the plurality of SUs from another computing device or a SU of the plurality of SUs, and a query operation with the SU within the plurality of SUs; and
facilitate assignment of a SU address range for the commissioned SU that was previously non-commissioned within the plurality of SUs based on the SU address range assignments of the subset of the at least some of the plurality of SUs includes at least one of selection of an available address range with regards to the subset of the at least some of the plurality of SUs, issuance of a range assignment request that includes a selected address range for the assignment of the SU address range to the another computing device or the SU of the plurality of SUs, receipt of a favorable address range assignment response from the another computing device or the SU of the plurality of SUs, storing the selected address range, or sending the selected address range to the subset of the at least some of the plurality of SUs.

12. The computing device of claim 11, wherein the processing module, when operable within the computing device based on the operational instructions, is further configured to:
detect the commissioned SU that was previously non-commissioned within the plurality of SUs based on at least one of a commissioning message received from a SU within the plurality of SUs, a query operation with the SU within the plurality of SUs, receiving an authentication request from the SU within the plurality of SUs, or detection of a reset of the commissioned SU that was previously non-commissioned within the plurality of SUs.

13. The computing device of claim 11, wherein the processing module, when operable within the computing device based on the operational instructions, is further configured to:
identify the at least some of the plurality of SUs that include commissioned SUs among the plurality of SUs based on at least one of a lookup from a database that stores commissioning information regarding the at least some of the plurality of SUs, a query operation associated with at least one SU of the at least some of the plurality of SUs, a ping test operation with the at least one SU of the at least some of the plurality of SUs, obtaining of an internet protocol address of the at least one SU of the at least some of the plurality of SUs, identification of a common router identifiers among the at least one SU of the at least some of the plurality of SUs, a measure of a level of bandwidth associated with at least one SU of the at least some of the plurality of SUs, or an estimation of a distance to each SU of the at least some of the plurality of SUs.

14. A method for execution by a computing device, the method comprising:

detecting a commissioned storage unit (SU) that was previously non-commissioned within a plurality of storage units (SUs) that are implemented within a dispersed or distributed storage network (DSN);

identifying at least some of the plurality of SUs that include commissioned SUs among the plurality of SUs;

identifying a SU topology of the at least some of the plurality of SUs;

selecting a subset of the at least some of the plurality of SUs based on the SU topology based on a favorable condition of the commissioned SU that was previously non-commissioned within the plurality of SUs, wherein the favorable condition includes at least one of a physical proximity of the commissioned SU that was previously non-commissioned within the plurality of SUs favorably comparing to a physical proximity threshold, a virtual proximity of the commissioned SU that was previously non-commissioned within the plurality of SUs favorably comparing to a virtual proximity threshold, a bandwidth availability of the commissioned SU that was previously non-commissioned within the plurality of SUs favorably comparing to a bandwidth threshold, or a performance level of the commissioned SU that was previously non-commissioned within the plurality of SUs favorably comparing to a performance threshold;

obtaining SU address range assignments of the subset of the at least some of the plurality of SUs; and facilitating, via an interface of the computing device configured to interface and communicate with the DSN, assignment of a SU address range for the commissioned SU that was previously non-commissioned within the plurality of SUs based on the SU address range assignments of the subset of the at least some of the plurality of SUs.

15. The method of claim 14 further comprising:
detecting the commissioned SU that was previously non-commissioned within the plurality of SUs based on at least one of a commissioning message received from a SU within the plurality of SUs, a query operation with the SU within the plurality of SUs, receiving an authentication request from the SU within the plurality of SUs, or detection of a reset of the commissioned SU that was previously non-commissioned within the plurality of SUs.

16. The method of claim 14 further comprising:
identifying the at least some of the plurality of SUs that include commissioned SUs among the plurality of SUs based on at least one of a lookup from a database that stores commissioning information regarding the at least some of the plurality of SUs, a query operation associated with at least one SU of the at least some of the plurality of SUs, a ping test operation with the at least one SU of the at least some of the plurality of SUs, obtaining of an internet protocol address of the at least one SU of the at least some of the plurality of SUs, identification of a common router identifiers among the at least one SU of the at least some of the plurality of SUs, a measure of a level of bandwidth associated with at least one SU of the at least some of the plurality of SUs, or an estimation of a distance to each SU of the at least some of the plurality of SUs.

17. The method of claim 14, wherein:
a set of encoded data slices (EDSs) is distributedly stored within the plurality of SUs;
a data object is segmented into a plurality of data segments;
a data segment of the plurality of data segments is dispersed error encoded in accordance with dispersed error encoding parameters to produce the set of EDSs; and wherein at least one of:
a decode threshold number of EDSs are needed to recover the data segment;
a read threshold number of EDSs provides for reconstruction of the data segment; or
a write threshold number of EDSs provides for a successful transfer of the set of EDSs from a first at least one location in the DSN to a second at least one location in the DSN.

18. The method of claim 14 further comprising:
obtaining the SU address range assignments of the subset of the at least some of the plurality of SUs based on at least one of a lookup from a database that stores commissioning information regarding the SU address range assignments of the subset of the at least some of the plurality of SUs, receipt of the SU address range assignments of the subset of the at least some of the plurality of SUs from another computing device or a SU of the plurality of SUs, and a query operation with the SU within the plurality of SUs.

19. The method of claim 14 further comprising:
facilitating the assignment of the SU address range for the commissioned SU that was previously non-commissioned within the plurality of SUs based on the SU address range assignments of the subset of the at least some of the plurality of SUs includes at least one of selection of an available address range with regards to the subset of the at least some of the plurality of SUs, issuance of a range assignment request that includes a selected address range for the assignment of the SU address range to another computing device or a SU of the plurality of SUs, receipt of a favorable address range assignment response from the another computing device or the SU of the plurality of SUs, storing the selected address range, or sending the selected address range to the subset of the at least some of the plurality of SUs.

20. The method of claim 14, wherein at least one of:
the computing device includes a SU of the plurality of SUs within the DSN, a wireless smart phone, a laptop, a tablet, a personal computers (PC), a work station, or a video game device; or
the DSN includes at least one of a wireless communication system, a wire lined communication system, a non-public intranet system, a public internet system, a local area network (LAN), or a wide area network (WAN).

* * * * *